(12) United States Patent
Yamazaki et al.

(10) Patent No.: US 6,791,770 B2
(45) Date of Patent: Sep. 14, 2004

(54) LENS BARREL (75) Inventors: Satoshi Yamazaki, Ohta-ku (JP);
Tsuneo Watanabe, Nakano-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/440,306

(22) Filed: May 19, 2003

(65) Prior Publication Data

US 2003/0218809 A1 Nov. 27, 2003

(30) Foreign Application Priority Data

May 21, 2002  (JP) ........................................ 2002-146584

(51) Int. Cl.[7] ............................ G02B 7/02; G02B 17/00
(52) U.S. Cl. ........................ 359/819; 359/827; 396/419
(58) Field of Search ................................. 359/821, 809, 359/811, 812, 818, 819, 827, 829; 396/526, 428, 419–422, 424; 362/455; 353/100

(56) References Cited

U.S. PATENT DOCUMENTS 5,625,853 A * 4/1997 Ihara ........................ 396/419
6,637,904 B2 * 10/2003 Hernandez ................... 362/8

* cited by examiner

*Primary Examiner*—Hung Xuan Dang
*Assistant Examiner*—Joseph Martinez
(74) *Attorney, Agent, or Firm*—Oliff & Berridge, PLC (57) ABSTRACT A lens barrel comprises a lens barrel body having a photographic optical system; a first mount unit that is fitted to the lens barrel body; and a second mount unit having a fixing unit for fixing the lens barrel body to a stand, that is detachably fitted to the first mount unit by being slid along a direction substantially parallel to an optical axis of the photographic optical system.

11 Claims, 9 Drawing Sheets

// LENS BARREL

INCORPORATION BY REFERENCE

The disclosure of the following priority application is herein incorporated by reference:

Japanese Patent Application No. 2002-146584 filed May 21, 2002

BACKGROUND OF THE INVENTION

1. Field of the Invention

The present invention relates to a lens barrel provided with a tripod mount.

2. Description of the Related Art

A long focal length lens barrel is commonly provided with a tripod mount for fixing the lens barrel to a tripod. An operator fixes the lens barrel to the tripod via the tripod mount and stabilizes the lens barrel and camera body to perform photography.

There are also cases where the operator takes a photograph holding the lens barrel and the camera body in his/her hands without using the tripod. However, in these cases, the protrusion of the tripod mount and the weight of the tripod mount adversely affect operability of the lens barrel when performing e.g., zooming.

SUMMARY OF THE INVENTION

The present invention is to provide a lens barrel fitted with a tripod mount and having a high operability.

A lens barrel according to the present invention comprises a lens barrel body having a photographic optical system; a first mount unit that is fitted to the lens barrel body; and a second mount unit having a fixing unit for fixing the lens barrel body to a stand, that is detachably fitted to the first mount unit by being slid along a direction substantially parallel to an optical axis of the photographic optical system.

It is preferable that the first mount unit comprises a projecting portion, an end of which widens as projecting from the lens barrel body and, the second mount unit comprises a groove that corresponds to the projecting portion.

It is also preferable that the first mount unit includes a substantially annular ring portion that is rotatable with respect to the lens barrel body and is fitted around the lens barrel body as a unit, and a rotation-controlling portion that regulates rotation between the lens barrel body and the ring portion. It desirable that the projecting portion and the groove are a dovetail and a dovetail groove, respectively. The projecting portion may be formed as part of a substantial cone.

It is preferable to further comprise a slit portion that alters an amount of gap appearing when the first mount unit and the second mount unit are fitted together; and a fixing screw that alters a width of the slit portion to alter the amount of gap, and fixes/releases the first mount unit and the second mount unit. A dropout prevention member may also be comprised that keeps an engaged state between the first mount unit and the second mount unit when the fixing screw is loose. It is preferable that the dropout prevention member is disposed at the second mount unit, the dropout prevention member having a protruding portion and being urged by force of a spring towards the first mount unit to engage the protruding portion with a hole portion formed in the first mount unit when the first mount unit and the second mount unit are fitted together.

The hole portion formed in the first mount unit may be used as a threaded hole for fixing the lens barrel body to the stand when the second mount unit is not mounted to the first mount unit. It is possible that the dropout prevention member further includes an engagement release portion, and that the dropout prevention member causes the protruding portion to move straight against the force of the spring to release engagement between the protruding portion and the hole portion when the engagement release portion is operated. It is also acceptable that the dropout prevention member causes the protruding portion to swing against the force of the spring to release engagement between the protruding portion and the hole portion when the engagement release portion is operated.

DESCRIPTION OF THE PREFERRED EMBODIMENTS

First Embodiment

A lens barrel according to a first embodiment of the present invention will be described in detail using the drawings.

Figure 1:
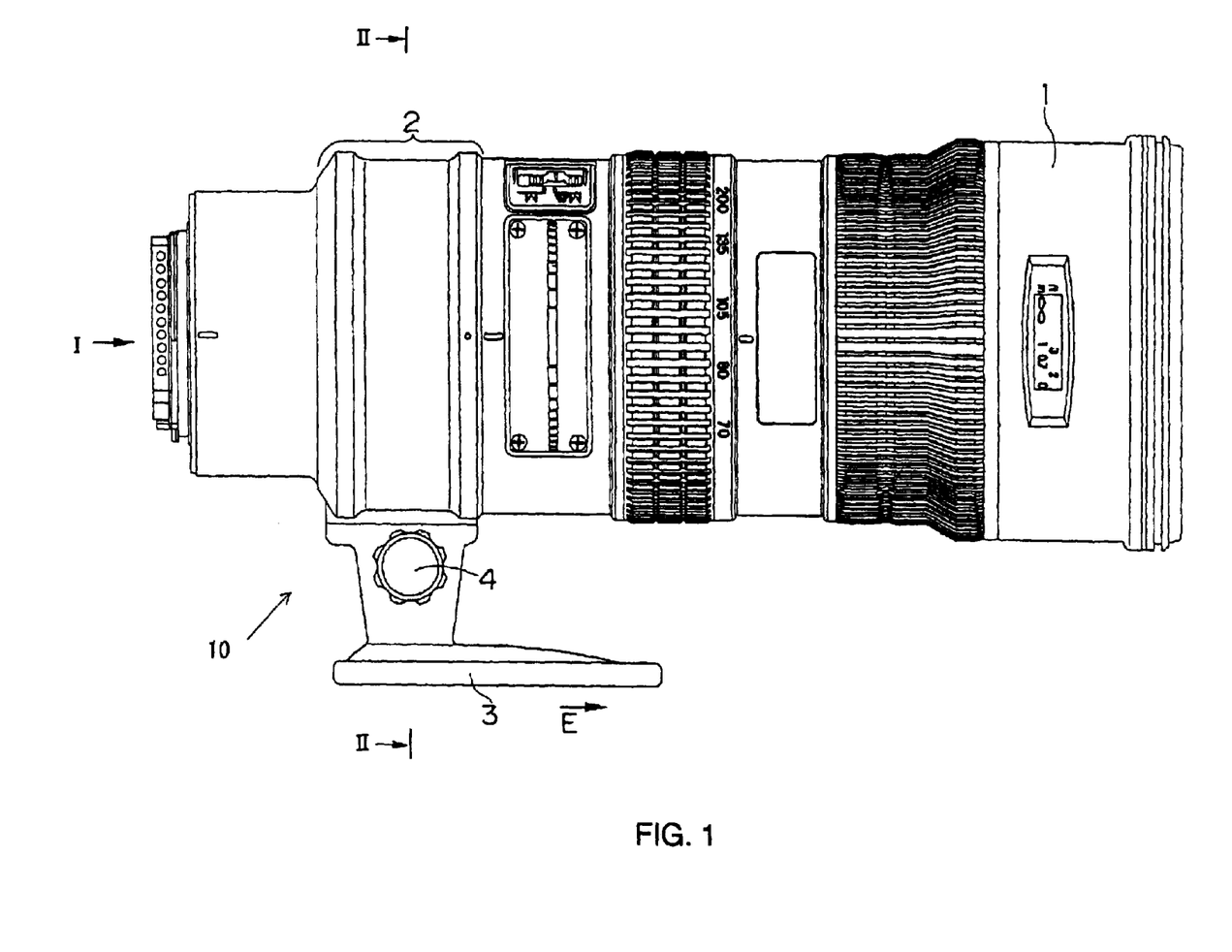
FIG. 1 is a side view of a lens barrel according to a first embodiment of the present invention.
Figure 2:
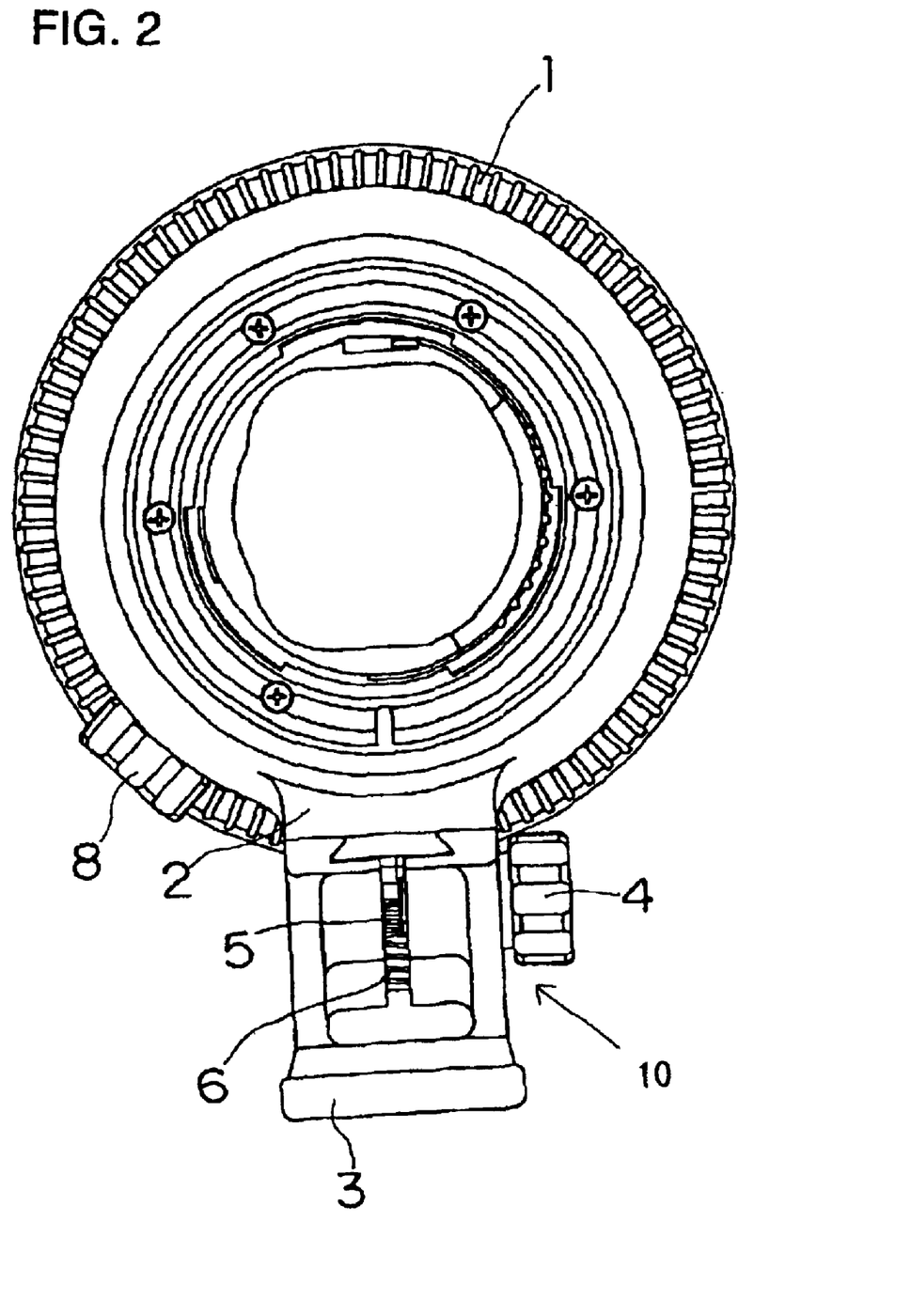
FIG. 2 is a view of the lens barrel shown in FIG. 1 seen from direction I.
Figure 3:
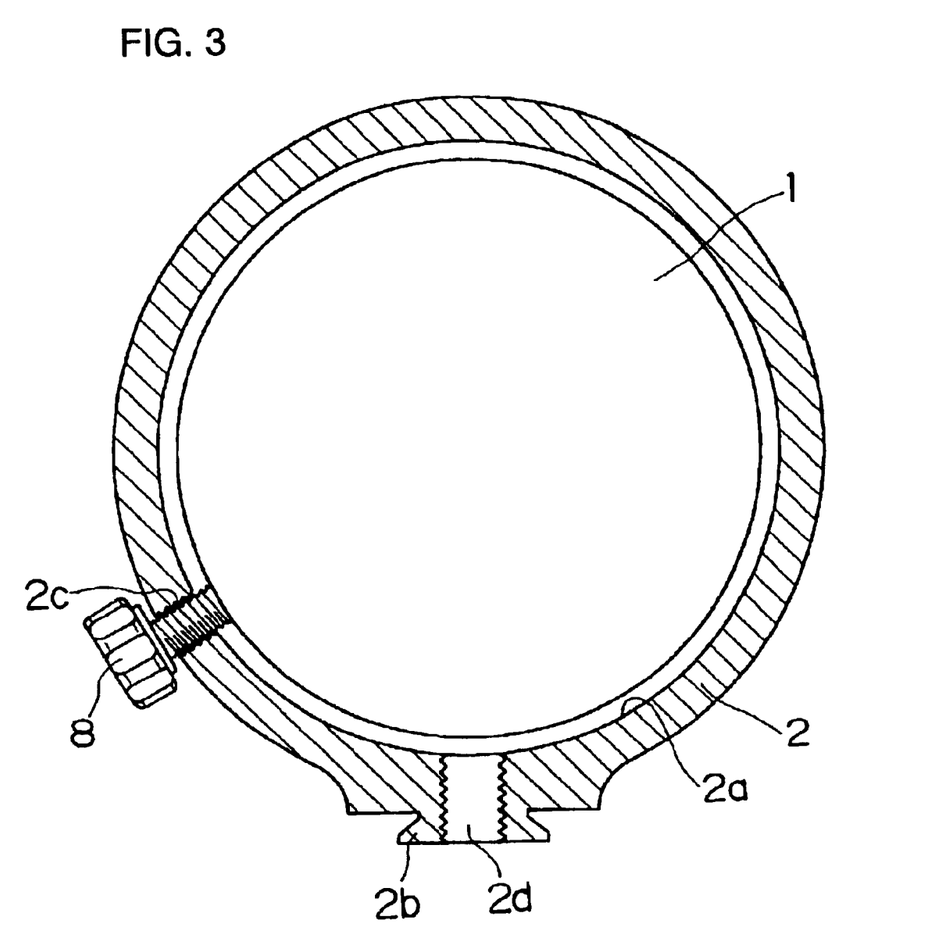
FIG. 3 is a cross-sectional view taken along line II—II of a ring member of the lens barrel shown in FIG. 1.

FIG. 1 is a side view of a lens barrel according to the first embodiment of the present invention. FIG. 2 is a view of the lens barrel shown in FIG. 1 seen from direction I. FIG. 3 is a II—II cross-sectional view of a first tripod mount unit 2 of the lens barrel shown in FIG. 1.

As shown in FIGS. 1 and 2, the lens barrel according to the first embodiment is provided with a lens barrel body 1 and a tripod mount 10. A photographic optical system including a lens group and a lens group drive mechanism is disposed inside the lens barrel body 1. The lens barrel shown in FIG. 1 is a zoom lens, and the focal length thereof is, for example, 70 to 200 mm.

The tripod mount 10 comprises the first tripod mount unit 2 and a second tripod mount unit 3. The second tripod mount unit or a base portion 3 is detachably mounted to the first tripod mount unit 2, as will be described later. Here, the portion at which the first tripod mount unit 2 and the second tripod mount unit 3 are fitted together is referred to as a tripod mount fitting unit.

As shown in FIG. 3, the first tripod mount unit 2 is a substantially annular ring member that is rotatably fitted together with the lens barrel body 1. The ring member 2 includes a substantially circular ring portion 2a, a dovetail 2b, a rotation-controlling threaded hole 2c, and a hole portion 2d.

The ring portion 2a is fitted, substantially seamlessly in the circumferential direction, to an outer peripheral surface of the circular lens barrel body 1. Therefore, the dimensional relation between the outer diameter of the lens barrel body 1 and the inner diameter of the ring portion 2a, i.e., the fitting dimension, is held at a predetermined value, and the ring portion 2a can be smoothly rotated and slid with respect to the lens barrel body 1.

As shown in FIG. 3, an end of the dovetail 2b widens. The dovetail 2b is fitted together with a dovetail groove 3b of the base portion 3 (see FIG. 6), and joins the ring member 2 and the base portion 3. The hole portion 2d that engages with a lock plate 5, as will be described later, is disposed in the dovetail 2b. It should be noted that the hole portion 2d is formed as a female screw (an internal thread), and that it can be used as a threaded hole for fixing the lens barrel body 1 to a stand such as a unipod or a tripod.

The rotation-controlling threaded hole 2c is provided in the ring portion 2a in order to control or prevent, with a rotation-controlling screw 8, the rotation of the ring member 2 with respect to the lens barrel body 1. The rotation-controlling screw 8 is screwed into the rotation-controlling threaded hole 2c, and an end of the rotation-controlling screw 8 abuts against the lens barrel body 1, whereby relative rotation between the ring member 2 and the lens barrel body 1 can be prevented.

Figure 4:
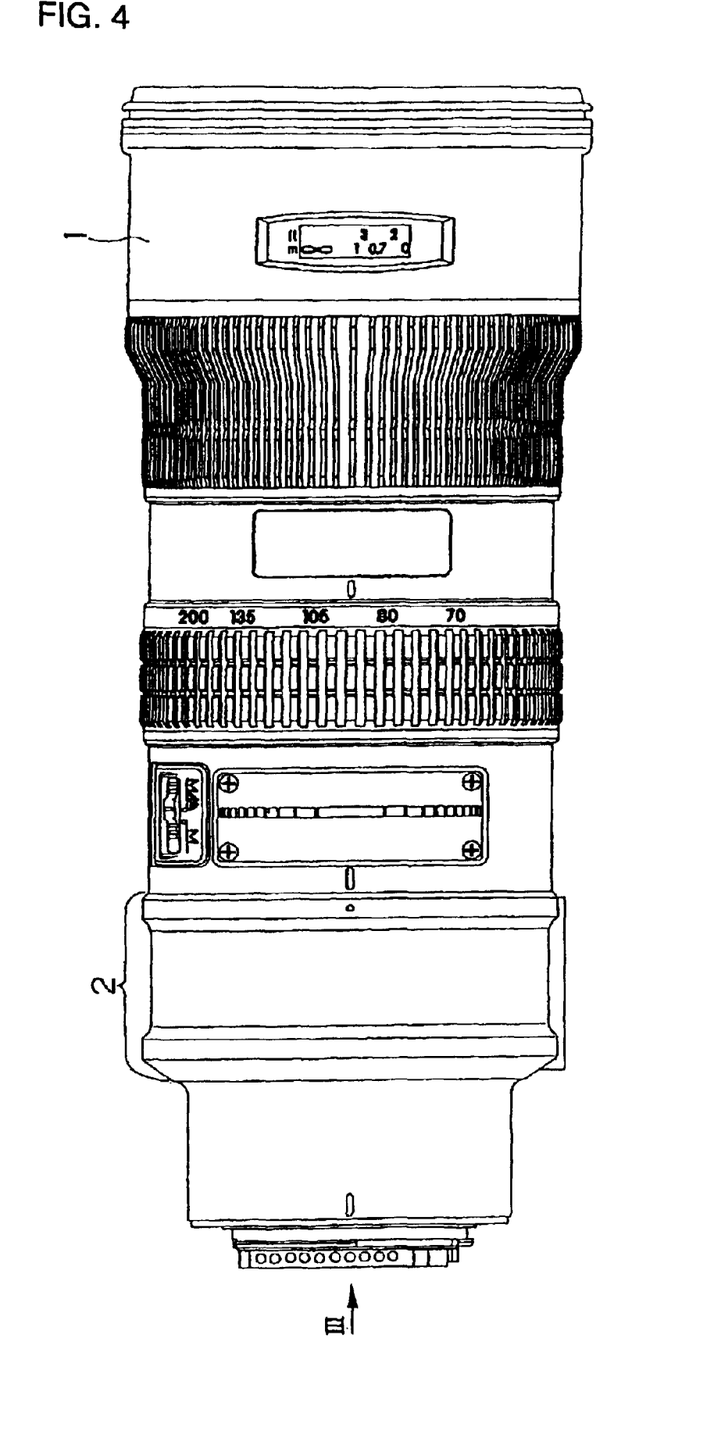
FIG. 4 is a side view of the lens barrel with its base removed.
Figure 5:
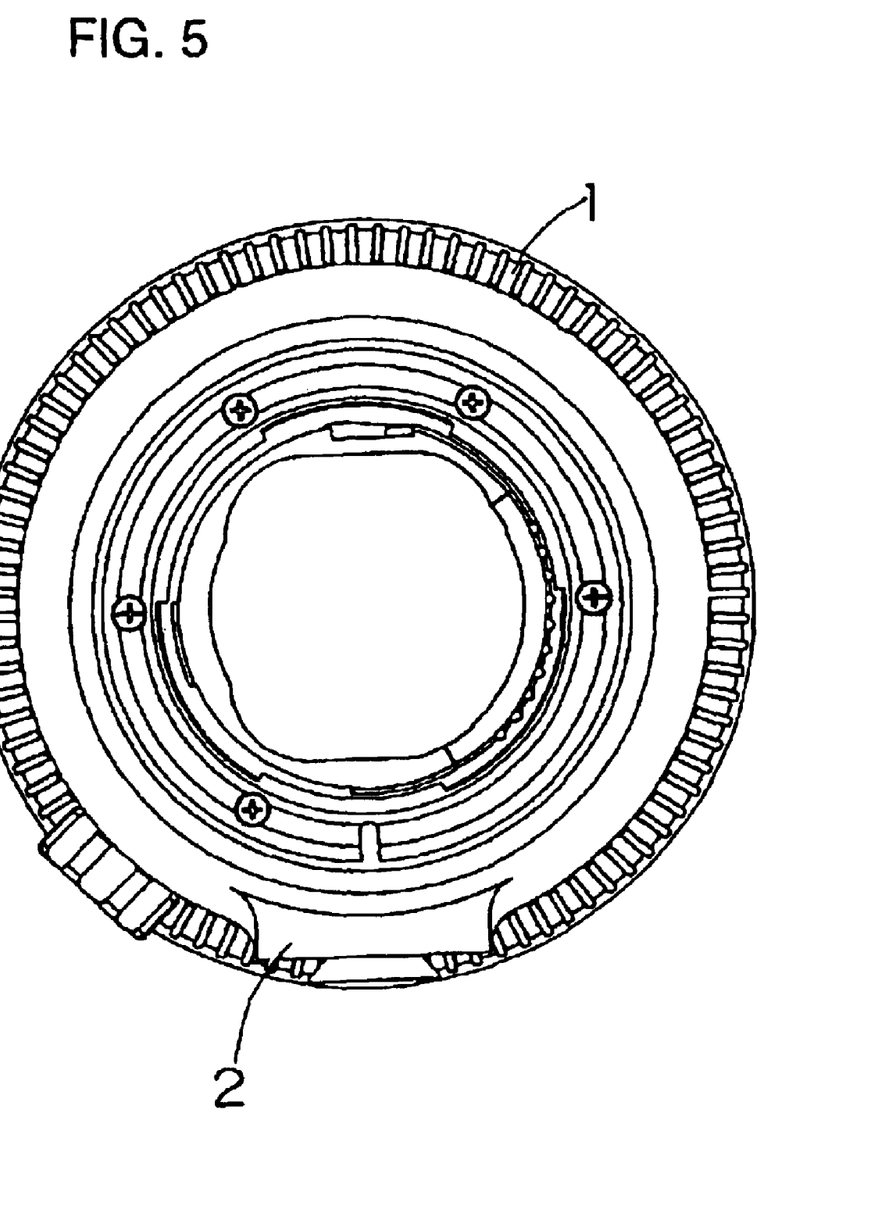
FIG. 5 is a view of the lens barrel shown in FIG. 4 seen from direction III.

FIG. 4 is a side view of the lens barrel in a state in which the base portion 3 has been removed from the ring member 2. FIG. 5 is a view of the lens barrel shown in FIG. 4 seen from direction III. As shown in FIGS. 4 and 5, when the base portion 3 has been removed from the ring member 2, there is no unnecessary protruding portion on the lens barrel, and the lens barrel is compact and lightweight.

Figure 6:
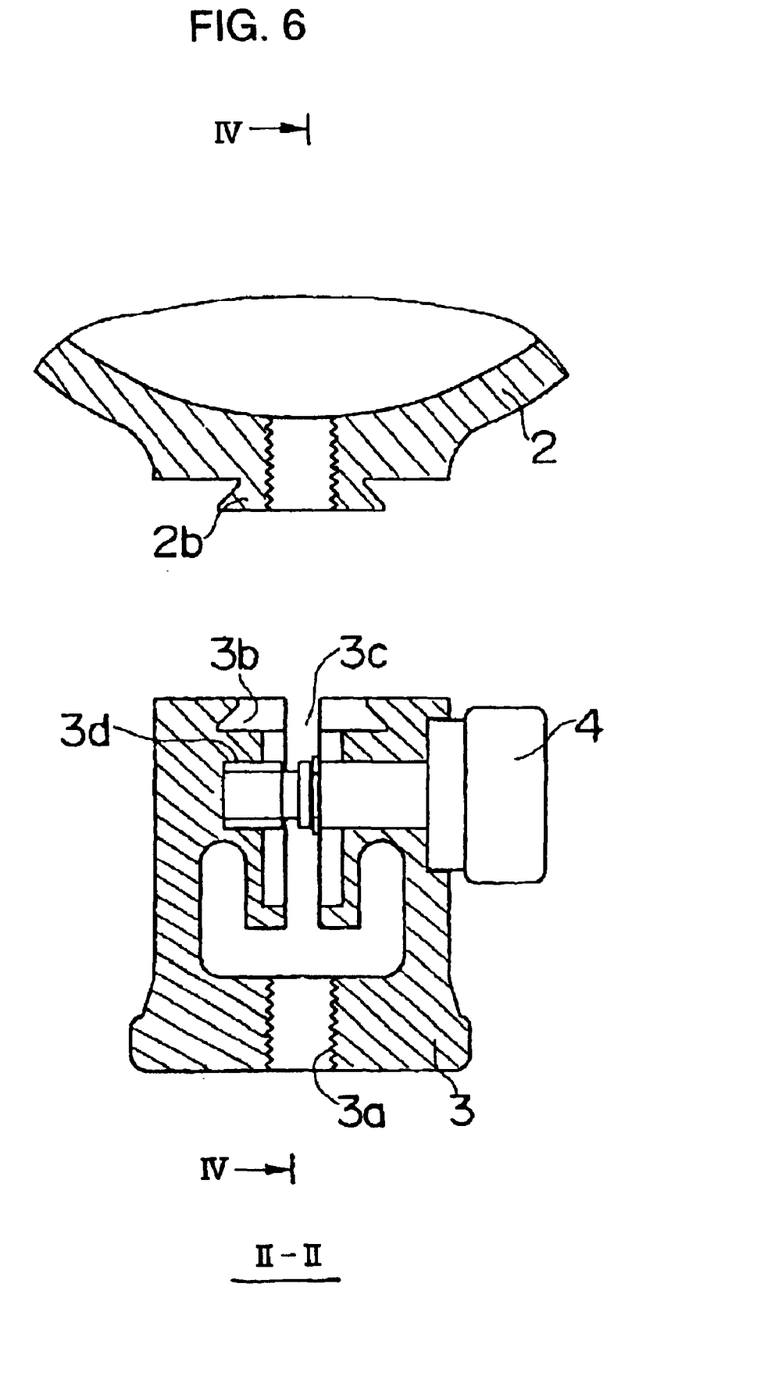
FIG. 6 is a cross-sectional view taken along line II—II of a tripod mount fitting unit of the lens barrel shown in FIG. 1.
Figure 7:
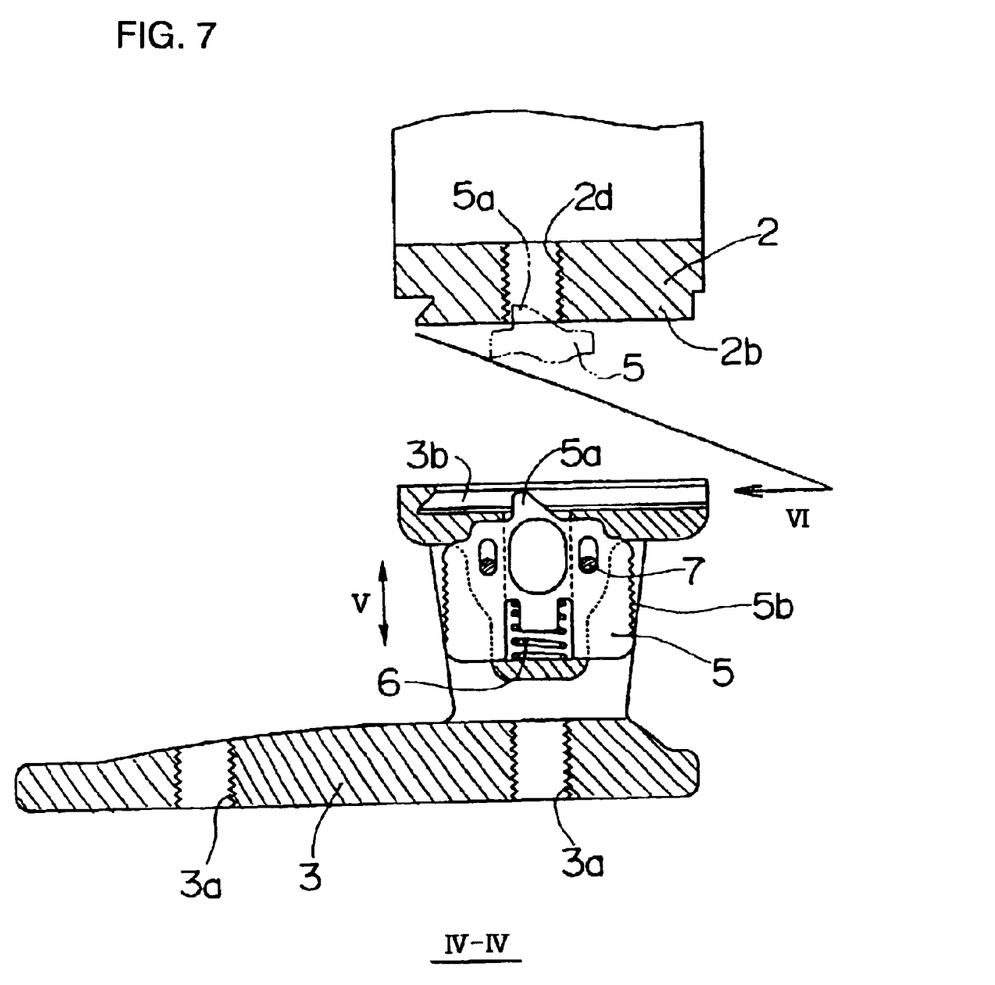
FIG. 7 is a cross-sectional view taken along line IV—IV of the tripod mount fitting unit shown in FIG. 6.

FIG. 6 is a II—II cross-sectional view of the vicinity of the tripod mount fitting unit i.e., the portion at which the ring member 2 and the base portion 3 are fitted together, of the lens barrel shown in FIG. 1. FIG. 7 is a IV—IV cross-sectional view of FIG. 6. It should be noted that FIGS. 6 and 7 show a state in which the ring member 2 and the base portion 3 are separated for easier viewing.

As shown in FIGS. 6 and 7, the base portion 3 comprises tripod threaded holes 3a, the dovetail groove 3b, a slit portion 3c, and a fixing threaded hole 3d. The tripod threaded holes 3a are disposed, for example, in two places in an optical axis direction of the lens group of the lens barrel body 1 i.e., in the left-right direction of FIG. 7. The base portion 3 and the lens barrel body 1 can be fixed to a stand, e.g. a tripod by screwing tripod screws disposed at the tripod into the tripod threaded holes 3a of the base portion 3.

The dovetail groove 3b has a shape that corresponds to the shape of the dovetail 2b of the ring member 2, and is fitted together with the dovetail 2b to join the ring member 2 and the base portion 3. The slit portion 3c, which extends in the left-right direction of FIG. 7, is formed in a center of the dovetail groove 3b, and the fixing threaded hole 3d is formed in a direction substantially orthogonal to the slit portion 3c.

The slit portion 3c is provided to alter the amount of gap of the portion at which the dovetail 2b and the dovetail groove 3b are fitted together. When a fixing screw 4 is screwed into the fixing threaded hole 3d and tightened, the width of the slit portion 3c i.e., the width in the left-right direction of FIG. 6, becomes narrow, and the width of the dovetail groove 3b also becomes narrow. Thus, the dovetail 2b and the dovetail groove 3b can be tightly engaged. Particularly when the dovetail 2b and the dovetail groove 3b are used, forces in vertical direction and left-right direction act on the portion at which the dovetail 2b and the dovetail groove 3b are fitted together due to the fixing screw 4 being tightened. Here, a width of the dovetail 2b widens as it protrudes from the lens barrel body 1 to form inclined surfaces, and the dovetail 2b extends in the right-left direction of FIG. 7, in other words in a direction parallel to an optical axis of the photographic optical system of the lens barrel body 1. In this manner, as the width of the dovetail groove 3b becomes small, the dovetail 2b is squeezed by the dovetail groove 3b in the right-left direction of FIG. 6, and at the same time, the dovetail 2b is pressed against the bottom of the dovetail groove 3b by the force acting on the inclined surfaces of the dovetail 2b from the dovetail groove 3b. Therefore, the ring member 2 and the base portion 3 can be reliably fixed.

As shown in FIG. 7, the lock plate 5 is inserted into the slit portion 3c of the base portion 3. The lock plate 5 comprises a protruding portion 5a which engages with the hole portion 2d of the ring member 2, and a knurl portion 5b. The lock plate 5 is urged in the upper direction of FIG. 7 and towards the lens barrel body 1 and the ring member 2 by a spring 6. The lock plate 5 is movable inside the slit portion 3c in the direction of arrow V (i.e., in the vertical direction of FIG. 7) in accordance with a guide pin 7.

Next, operation relating to the tripod mount 10 of the lens barrel described above will be explained.

When taking a photographs with the lens barrel body 1 fixed to the stand, such as a tripod or the like, the base portion 3 should be fixed to the ring member 2 of the lens barrel body 1, as shown in FIGS. 1 and 2. To that end, an operator inserts the dovetail 2b of the ring member 2 into the dovetail groove 3b of the base portion 3 from the direction of arrow VI, as shown in FIG. 7. When the dovetail 2b has been appropriately inserted into the dovetail groove 3b, the protruding portion 5a of the lock plate 5 enters and engages with the hole portion 2d of the ring member 2 due to the spring force of the spring 6. After the dovetail 2b has been appropriately inserted into the dovetail groove 3b, the operator tightens the fixing screw 4 to fix the base portion 3, the ring member 2, and the lens barrel body 1 as a unit.

By engaging the protruding portion 5a with the hole portion 2d, movement of the ring member 2 in the left-right direction in FIG. 7 (i.e., the optical axis direction of the lens group of the lens barrel body 1) is restricted, and the ring member 2 and the lens barrel body 1 are prevented from accidentally falling out from the base portion 3 in a state in which the fixing screw 4 is loose.

After the base portion 3 has been fixed to the ring member 2 in this manner, screws of the tripod are tightened in the tripod threaded holes 3a so that the base portion 3 is fixed to the tripod.

When the operator holds the lens barrel in his/her hand and photographs without using a tripod, the base portion 3 shall be removed from the ring member 2 fitted together with the lens barrel body 1, as shown in FIGS. 4 and 5. In this case, the operator first loosens the fixing screw 4. The operator then pinches the knurl portion 5b of the lock plate 5 from the left and right directions of FIG. 7, pushes it downward in the direction of arrow F, and releases the engagement between the hole portion 2b and the protruding portion 5a. After the engagement between the hole portion 2b and the protruding portion 5a has been released, the operator relatively slides the base portion 3 along the ring member 2 and the lens barrel body 1, and removes the dovetail 2b from the dovetail groove 3b of the base portion 3.

After the base portion 3 has been removed from the ring member 2 in this manner, the operator performs photography by supporting the lens barrel body 1 with his/her hand.

In the above-described first embodiment, the following advantages can be obtained.

(1) The lens barrel comprises the first tripod mount unit 2 and the second tripod mount unit 3 that is detachably fitted to the first tripod mount unit 2. When the stand such as a tripod or the like is used, the operator uses the tripod mount fitting unit to engage the first tripod mount unit 2 and the second tripod mount unit 3 and fixes the lens barrel body 1 to the tripod, whereby the photography can be performed. When a tripod is not used, the lens barrel is used in a state in which the second tripod mount unit 3 has been removed from the first tripod mount unit 2. Therefore, operability of the lens barrel during taking a photograph be improved because there is no unnecessary protrusion at the lens barrel and the weight of the lens barrel is also reduced.

(2) The first tripod mount unit 2 is rotatable with respect to the lens barrel body 1 and is seamlessly fitted in the circumferential direction of the lens barrel body 1. Specifically, the ring portion 2a of the first tripod mount unit 2 is formed as one member and mounted to the lens barrel body 1 so that a play or gap between the ring portion 2a and the lens barrel body 1 becomes extremely small. Thus, when the lens barrel body 1 is rotated with respect to a tripod after the lens barrel body 1 has been fixed to the tripod via the second tripod mount unit 3, unsteadiness of the lens barrel body 1 is suppressed and the lens barrel body 1 can be smoothly rotated. Also, the first tripod mount unit 2 comprises the rotation-controlling portion that regulates the rotation between the lens barrel body 1 and the ring portion 2a. Specifically, by screwing the rotation-controlling screw 8 into the rotation-controlling threaded hole 2c provided in the ring portion 2a, the rotation between the lens barrel body 1 and the ring portion 2a is regulated. Thus, the lens barrel body 1 and the ring portion 2a can be reliably fixed at an optional position.

(3) The tripod mount fitting unit uses the projecting portion, whose end widens as it projecting from the lens barrel body 1, and the groove that engages with the projecting portion to mount the first tripod mount unit 2 and the second tripod mount unit 3. Thus, the first tripod mount unit 2 and the second tripod mount unit 3 can be reliably fixed. In particular, by respectively configuring the projecting portion and the groove as shown in FIG. 6 as the dovetail 2b and the dovetail groove 3b, reliable fitting is possible with a simple configuration.

(4) The tripod mount fitting unit includes the slit portion 3c which alters the amount of gap appearing when the first tripod mount unit 2 and the second tripod mount unit 3 are fitted together, and the fixing screw 4. By tightening the fixing screw 4, the width of the slit portion 3c is altered to vary the amount of gap, and the first tripod mount unit 2 and the second tripod mount unit 3 are fixed/released. Thus, attachment and detachment of the first tripod mount unit 2 and the second tripod mount unit 3 can be easily conducted, and the first tripod mount unit 2 and the second tripod mount unit 3 can be reliably fitted together.

(5) The tripod mount fitting unit includes a dropout prevention member, i.e., the lock plate 5, and maintains an engaged state between the first tripod mount unit 2 and the second tripod mount unit 3, even when the fixing screw 4 is loose. Thus, when, for example, removing the lens barrel body from the second tripod mount unit 3, it is possible to prevent the lens barrel body 1 from accidentally becoming separated and falling out when the fixing screw 4 has been loosened.

(6) The protruding portion 5a of the lock plate 5 is urged by the spring force of the spring 6 towards first tripod mount unit 2 so as to engage with the hole portion 2d formed in the ring portion 2a when the first tripod mount unit 2 and the second tripod mount unit 3 engage. Therefore, the engaged state between the first tripod mount unit 2 and the second tripod mount unit 3 can be preserved with a simple configuration.

(7) The hole portion 2d formed in the ring portion 2a functions as a threaded hole for fixing the lens barrel body 1 to a stand, in particular to an unipod, when the second tripod mount unit 3 is not mounted to the first tripod mount unit 2. When the lens barrel body 1 is fixed to the unipod, the operator usually performs focusing and zooming of the lens barrel holding the unipod with his left hand and stabilizes the lens barrel and the camera body. Therefore, the operator can easily perform operation upon the lens barrel by directly fixing the unipod to the first tripod mount unit 2.

Modification 1 of the First Embodiment

Figure 8:
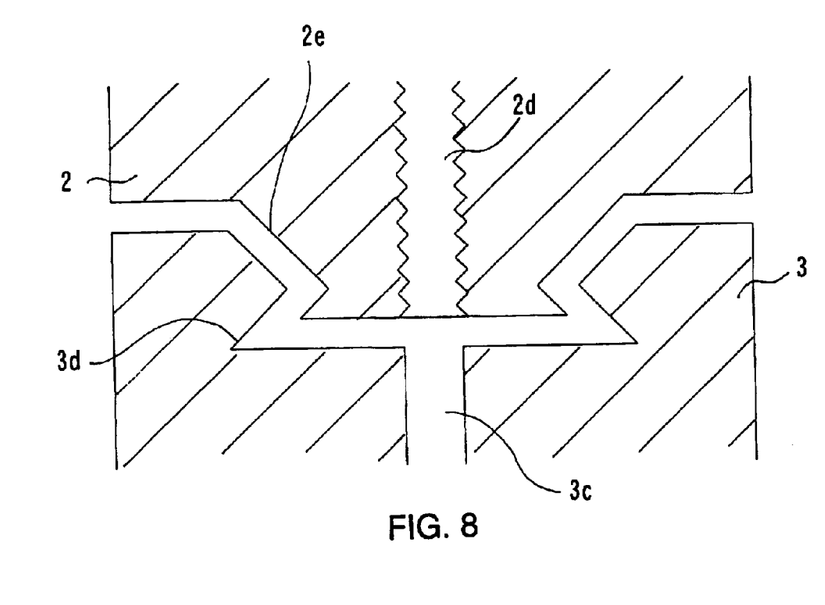
FIG. 8 is a cross-sectional view of the tripod mount fitting unit in a modification 1 of the first embodiment.

The shape of the tripod mount fitting unit that fits the ring member 2 and the base portion 3 together is not limited to the above described first embodiment. For example, as shown in FIG. 8, a projecting portion 2e, in which an end thereof widens and a middle thereof narrows, can be disposed at the ring member 2 in place of the dovetail 2b. In this case, a groove 3d having a shape suited for the projecting portion 2e is formed in the base portion 3.

As shown in FIG. 8, because an upper portion of the groove 3d is cut out to correspond to the shape of the projecting portion 2e, the upper end portion of the groove 3d is not deformed when the fixing screw 4 is tightened, and the groove 3d and the projecting portion 2e can be fixed more tightly. Also, because the groove 3d is not deformed, the setting of respective dimensional tolerances of the projecting portion 2e and the groove 3d can be alleviated in comparison with the first embodiment.

Modification 2 of the First Embodiment

Figure 9:
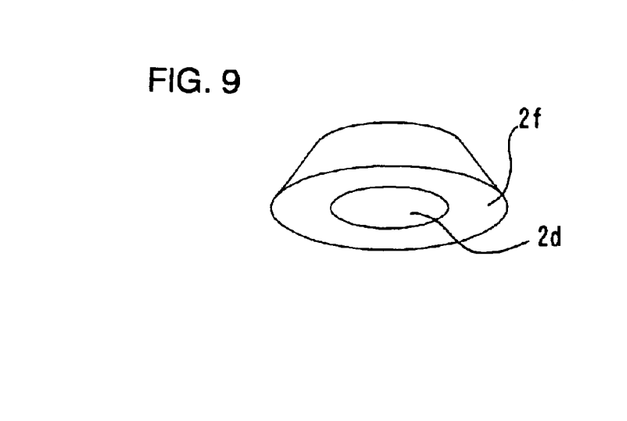
FIG. 9 is a view showing a projecting portion in a modification 2 of the first embodiment.

As shown in FIG. 9, a projecting portion 2f of the ring member 2 that engages with the dovetail groove 3b of the base portion 3 can be formed as part of a substantial cone. In this case, an outer diameter of the projecting portion 2f is increased towards an end of the projecting portion 2f.

When fitting the projecting portion 2f to the dovetail groove 3b, similar to the first embodiment, the operator slides and inserts the projecting portion 2f into the dovetail groove 3b. After the protruding portion 5a of the lock plate 5 is engaged with the hole portion 2d of the projecting portion 2f, the operator tightens the fixing screw 4 and reliably fixes the projecting portion 2f and the dovetail groove 3b. It should be noted that, because the projecting portion 2f has a substantially conical shape, the relative mounting direction of the base portion 3 with respect to the ring member 2 can be altered after the projecting portion 2f has been inserted into the dovetail portion 3b. After the operator has optionally set the mounting direction of the base portion 3 with respect to the lens barrel body 1 and the ring member 2, the operator tightens the fixing screw 4.

By forming the projecting portion 2f, which engages with the dovetail groove 3b, as part of a substantial cone, manufacture of the projecting portion 2f becomes easy and also the projecting portion 2f can be made small.

Modification 3 of the First Embodiment

Figure 10:
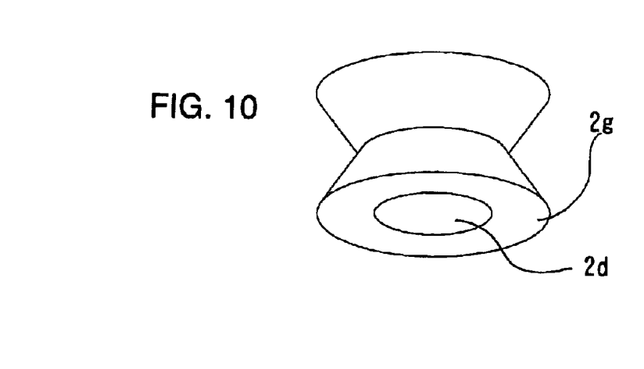
FIG. 10 is a view showing the projecting portion in a modification 3 of the first embodiment.

As shown in FIG. 10, a projecting portion 2g of the ring member 2 can be configured to have an hourglass shape.

Specifically, an hourglass shape is formed by narrowing the middle of the substantially conical projecting portion 2f shown in FIG. 9. In this case, the groove 3d of the base portion 3 as shown in FIG. 8 is formed which suits for the projecting portion 2g.

By configuring the projecting portion 2g to have an hourglass shape and cutting out the upper portion of the groove 3d that engages with the projecting portion 2g, manufacture of the projecting portion 2g becomes easy and setting of the dimensional tolerances of the projecting portion 2g and the groove 3d can be made alleviated.

Second Embodiment

In a second embodiment, it is arranged that the operator can easily release the lock between the base portion 3 and the ring member 2 when removing the base portion 3 from the ring member 2.

Figure 11:
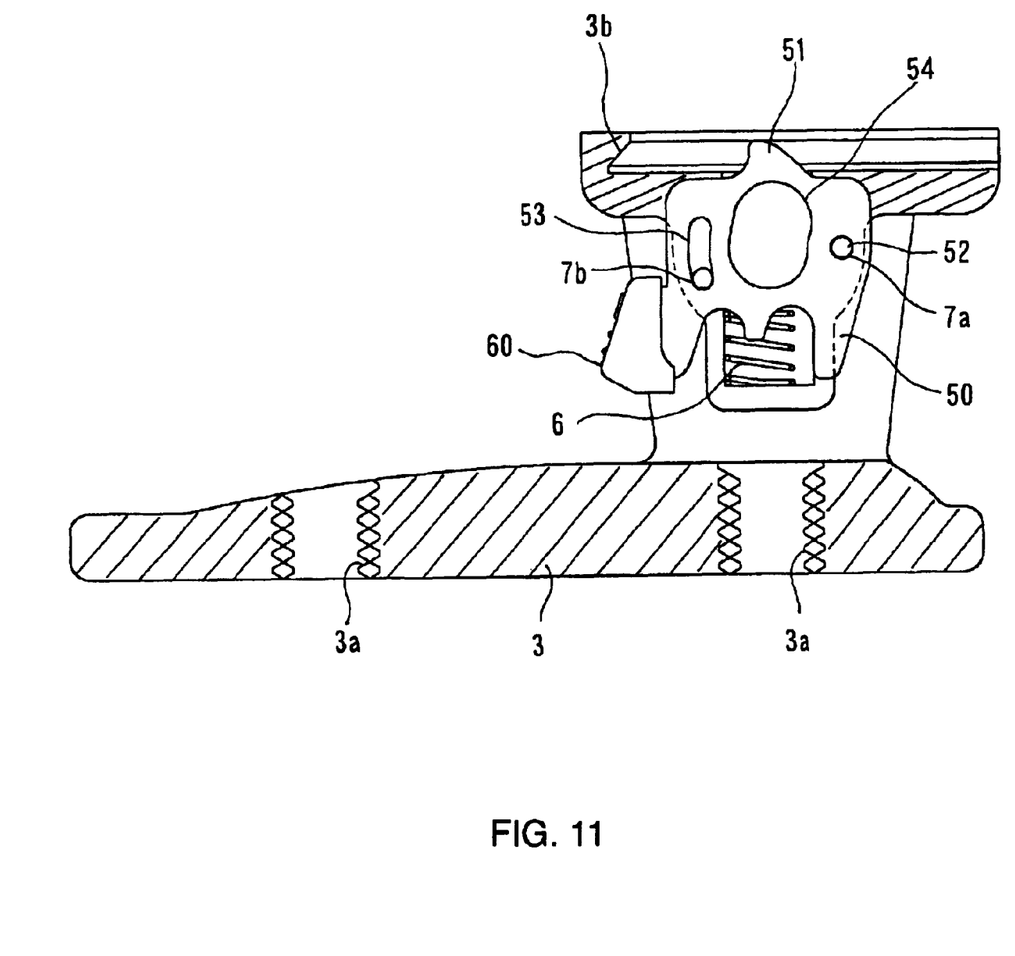
FIG. 11 is a view showing the configuration of a lock plate in a second embodiment.

FIG. 11 is a IV—IV cross-sectional view of the base portion 3 in the second embodiment. As shown in FIG. 11, a lock plate 50 comprises a protruding portion 51, a hole portion 52, a groove 53, and a hole 54 corresponding to the fixing threaded hole 3d of the base portion 3. Pins 7a and 7b are respectively inserted into the hole portion 52 and the groove 53. The lock plate 50 is urged in the upper direction of FIG. 11 and towards the ring member 2 and the lens barrel body 1) by the spring 6.

Also, a push button 60, which the operator operates when releasing the lock between the base portion 3 and the ring member 2 is connected with the lock plate 50. When the push button 60 is pushed, the lock plate 50 swings, associating with the push button 60 in the direction of arrow VII along the groove 53 using the pin 7a as a fulcrum. Thus, the protruding portion 51 withdraws from the dovetail groove 3b of the base portion 3 and releases the lock between the base portion 3 and the ring member 2.

The operator pushes the push button 60 with, for example, his/her index finger to release the lock between the base portion 3 and the ring member 2 and removes the dovetail 2b from the dovetail groove 3b.

In this manner, since the lock plate 51 swings on the pin 7a as a fulcrum, the operator can release the lock between the base portion 3 and the ring member 2 with his one finger, and can easily remove the base portion 3 from the ring member 2.

The above-described embodiments are mere examples, and various modifications can be made without departing from the spirit and scope of the invention.

What is claimed is:

1. A lens barrel comprising:
    a lens barrel body having a photographic optical system;
    a first mount unit that is fitted to the lens barrel body; and
    a second mount unit having a fixing unit for fixing the lens barrel body to a stand, that is detachably fitted to the first mount unit by being slid along a direction substantially parallel to an optical axis of the photographic optical system.

2. A lens barrel according to claim 1, wherein:
    the first mount unit comprises a projecting portion, an end of which widens as projecting from the lens barrel body and, the second mount unit comprises a groove that corresponds to the projecting portion.

3. A lens barrel according to claim 2, wherein:
    the projecting portion and the groove are a dovetail and a dovetail groove, respectively.

4. A lens barrel according to claim 2, wherein:
    the projecting portion is formed as part of a substantial cone.

5. A lens barrel according to claim 1, wherein:
    the first mount unit includes
        a substantially annular ring portion that is rotatable with respect to the lens barrel body and is fitted around the lens barrel body as a unit, and
        a rotation-controlling portion that regulates rotation between the lens barrel body and the ring portion.

6. A lens barrel according to claim 1, further comprising:
    a slit portion that alters an amount of gap appearing when the first mount unit and the second mount unit are fitted together; and
    a fixing screw that alters a width of the slit portion to alter the amount of gap, and fixes/releases the first mount unit and the second mount unit.

7. A lens barrel according to claim 6, further comprising:
    a dropout prevention member that keeps an engaged state between the first mount unit and the second mount unit when the fixing screw is loose.

8. A lens barrel according to claim 7, wherein:
    the dropout prevention member is disposed at the second mount unit, the dropout prevention member having a protruding portion and being urged by force of a spring towards the first mount unit to engage the protruding portion with a hole portion formed in the first mount unit when the first mount unit and the second mount unit are fitted together.

9. A lens barrel according to claim 8, wherein:
    the hole portion formed in the first mount unit functions as a threaded hole for fixing the lens barrel body to the stand when the second mount unit is not mounted to the first mount unit.

10. A lens barrel according to claim 8, wherein:
    the dropout prevention member further includes an engagement release portion, the dropout prevention member causing the protruding portion to move straight against the force of the spring to release engagement between the protruding portion and the hole portion when the engagement release portion is operated.

11. A lens barrel according to claim 8, wherein:
    the dropout prevention member further includes an engagement release portion, the dropout prevention member causing the protruding portion to swing against the force of the spring to release engagement between the protruding portion and the hole portion when the engagement release portion is operated.

* * * * *